(12) United States Patent
Ito et al.

(10) Patent No.: US 8,661,926 B2
(45) Date of Patent: Mar. 4, 2014

(54) ROBOT MANIPULATOR AND ROBOT SYSTEM

(75) Inventors: Masato Ito, Fukuoka (JP); Manabu Okahisa, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 336 days.

(21) Appl. No.: 12/899,490

(22) Filed: Oct. 6, 2010

(65) Prior Publication Data

US 2011/0064554 A1 Mar. 17, 2011

Related U.S. Application Data

(63) Continuation of application No. PCT/JP2009/054887, filed on Mar. 13, 2009.

(30) Foreign Application Priority Data

Apr. 7, 2008 (JP) .............................. P. 2008-099659

(51) Int. Cl.
*B25J 19/00* (2006.01)
*B25J 17/00* (2006.01)
*B25J 9/06* (2006.01)

(52) U.S. Cl.
USPC ........................... 74/490.01; 414/680; 901/15

(58) Field of Classification Search
USPC ........................... 414/680; 901/15; 74/490.01
See application file for complete search history.

(56) References Cited

U.S. PATENT DOCUMENTS

| | | | | |
|---|---|---|---|---|
| 4,589,184 A | * | 5/1986 | Asano et al. | ..................... 29/430 |
| 5,357,824 A | | 10/1994 | Hashimoto | |
| 5,737,500 A | * | 4/1998 | Seraji et al. | ..................... 700/251 |
| 6,178,842 B1 | | 1/2001 | Murata et al. | |
| 6,267,022 B1 | * | 7/2001 | Suzuki | ..................... 74/490.01 |
| 2005/0092122 A1 | * | 5/2005 | Markert et al. | ............ 74/490.01 |
| 2009/0114052 A1 | | 5/2009 | Haniya et al. | |

FOREIGN PATENT DOCUMENTS

| | | |
|---|---|---|
| JP | 59-15469 U | 1/1984 |
| JP | 03-202288 | 9/1991 |
| JP | 05-220681 | 8/1993 |
| JP | 07-000680 U | 1/1995 |
| JP | 08-323662 | 12/1996 |
| JP | 11-216692 | 8/1999 |
| JP | 2005-289326 | 10/2005 |
| WO | 2007/037131 | 4/2007 |

OTHER PUBLICATIONS

International Search Report for International Application No. PCT/JP2009/54887, Jun. 9, 2009.

Written Opinion of the International Searching Authority for International Application No. PCT/JP2009/54887, Jun. 9, 2009.

Supplementary European Search Report for corresponding EP Application No. 09729781.6-2316, Feb. 6, 2012.

(Continued)

*Primary Examiner* — Scott Lowe

(74) *Attorney, Agent, or Firm* — Ditthavong Mori & Steiner, P.C.

(57) ABSTRACT

A robot manipulator includes a plurality of joint shafts including at least first and second joint shafts. If the robot manipulator extends vertically with respect to a rotation center of the first joint shaft that rotates in a horizontal plane, a rotation center of the second joint shaft that rotates in another horizontal plane is offset from the rotation center of the first joint shaft.

16 Claims, 5 Drawing Sheets

(56) References Cited

OTHER PUBLICATIONS

Zhang et al., "Study on path planning of spot welding robot in BIW assembly and joint workstation", Machinery Design & Manufacture, Feb. 2006, pp. 72-74.

Chinese Office Action for corresponding CN Application No. 200980111780.4, Dec. 3, 2012.
Japanese Office Action for corresponding JP Application No. 2010-507198, May 21, 2013.

* cited by examiner

ROBOT MANIPULATOR AND ROBOT SYSTEM

CROSS-REFERENCE TO RELATED APPLICATIONS

The present application is a continuation application of PCT/JP2009/054887, filed Mar. 13, 2009, which claims priority to Japanese Patent Application No. 2008-099659, filed Apr. 7, 2008. The contents of these applications are incorporated herein by reference in their entirety.

BACKGROUND OF THE INVENTION

1. Field of the Invention

The present invention relates to a robot manipulator and a robot system.

2. Discussion of the Background

As described in International Publication No. WO/2007/037131, a manipulator of related art includes a plurality of arm bodies provided in series; joints rotatably connecting adjacent two of the arm bodies to each other, the joints having rotation axes, the rotation axis of each joint has an inclination of 90 degrees to the rotation axis of the adjacent joint; and at least a linear body arranged in the joints coaxially with the rotation axes, the joints being formed of servo-motors and reduction gear mechanisms.

SUMMARY OF THE INVENTION

According to one aspect of the present invention, a robot manipulator includes a plurality of joint shafts including at least first and second joint shafts. If the robot manipulator extends vertically with respect to a rotation center of the first joint shaft that rotates in a horizontal plane, a rotation center of the second joint shaft that rotates in another horizontal plane is offset from the rotation center of the first joint shaft.

According to another aspect of the present invention, the robot manipulator may be mounted on a rack and have a motion range extending from an upper position to a position below a base of the robot manipulator, so that the robot manipulator is arranged by efficiently using a space.

According to another aspect of the present invention, a robot manipulator includes a plurality of joint shafts including at least first to sixth joint shafts; a first arm body that rotates around the first joint shaft that is arranged within a horizontal plane; a second arm body that rotates around the second joint shaft that is arranged orthogonally to the first joint shaft; a third arm body that rotates around the third joint shaft that is arranged orthogonally to the second joint shaft; a fourth arm body that rotates around the fourth joint shaft that is arranged orthogonally to the third joint shaft; a fifth arm body that rotates around the fifth joint shaft that is arranged orthogonally to the fourth joint shaft; and a sixth arm body that rotates around the sixth joint shaft that is arranged orthogonally to the fifth joint shaft.

According to another aspect of the present invention, a robot system includes a plurality of robot manipulators to operate a good. At least a first robot manipulator of the robot manipulators is arranged between the good and at least a second robot manipulator of the robot manipulators.

According to another aspect of the present invention, if the plurality of robot manipulators work cooperatively, the second robot manipulator may be installed on a floor at a position between the first robot manipulator and the good, so that the first robot manipulator works on an upper section of the good and the second robot manipulator works on a lower section of the good.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
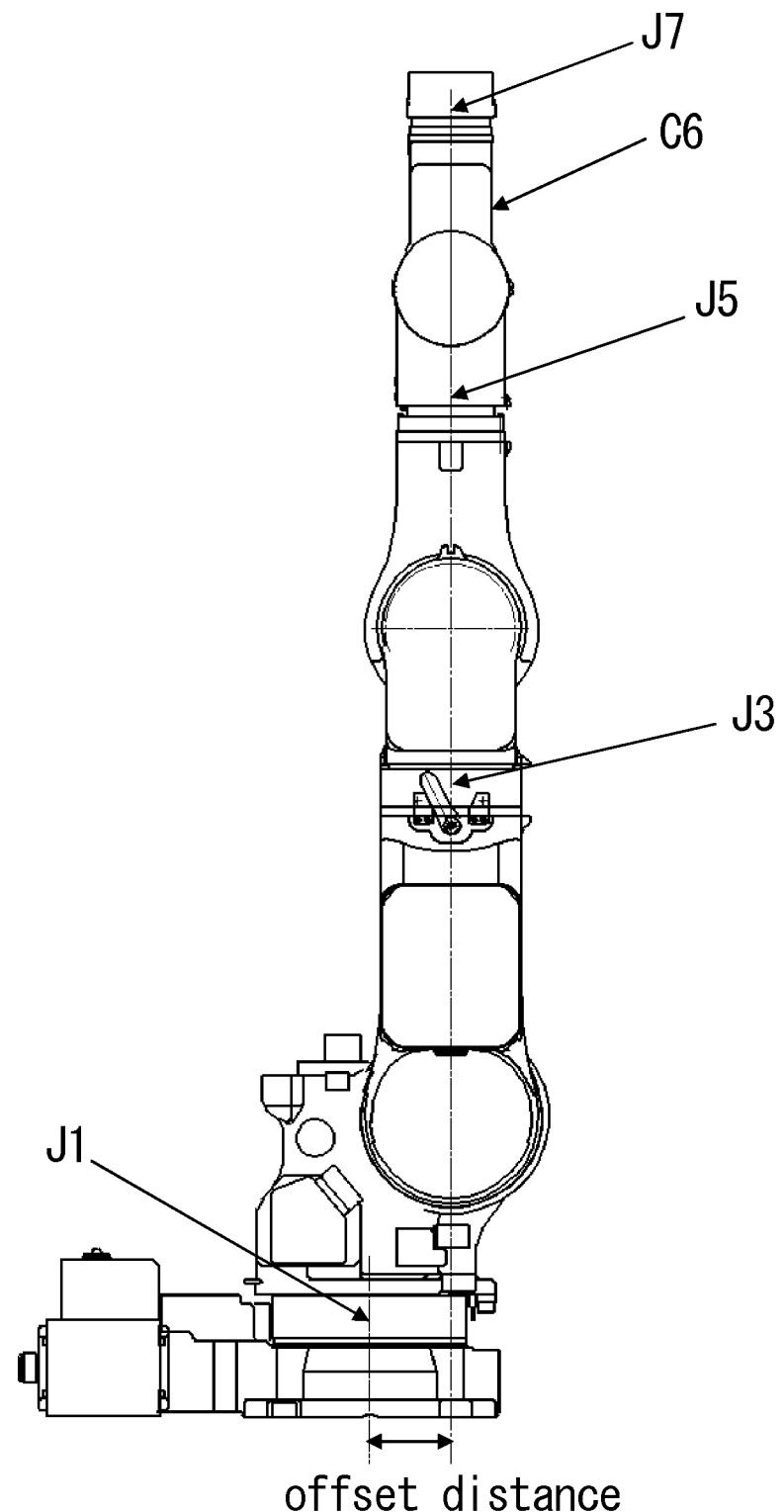
FIG. 1 is a side view of a robot manipulator.

Embodiments will now be described with reference to the accompanying drawings, wherein like reference numerals designate corresponding or identical elements throughout the various drawings.

Figure 2:
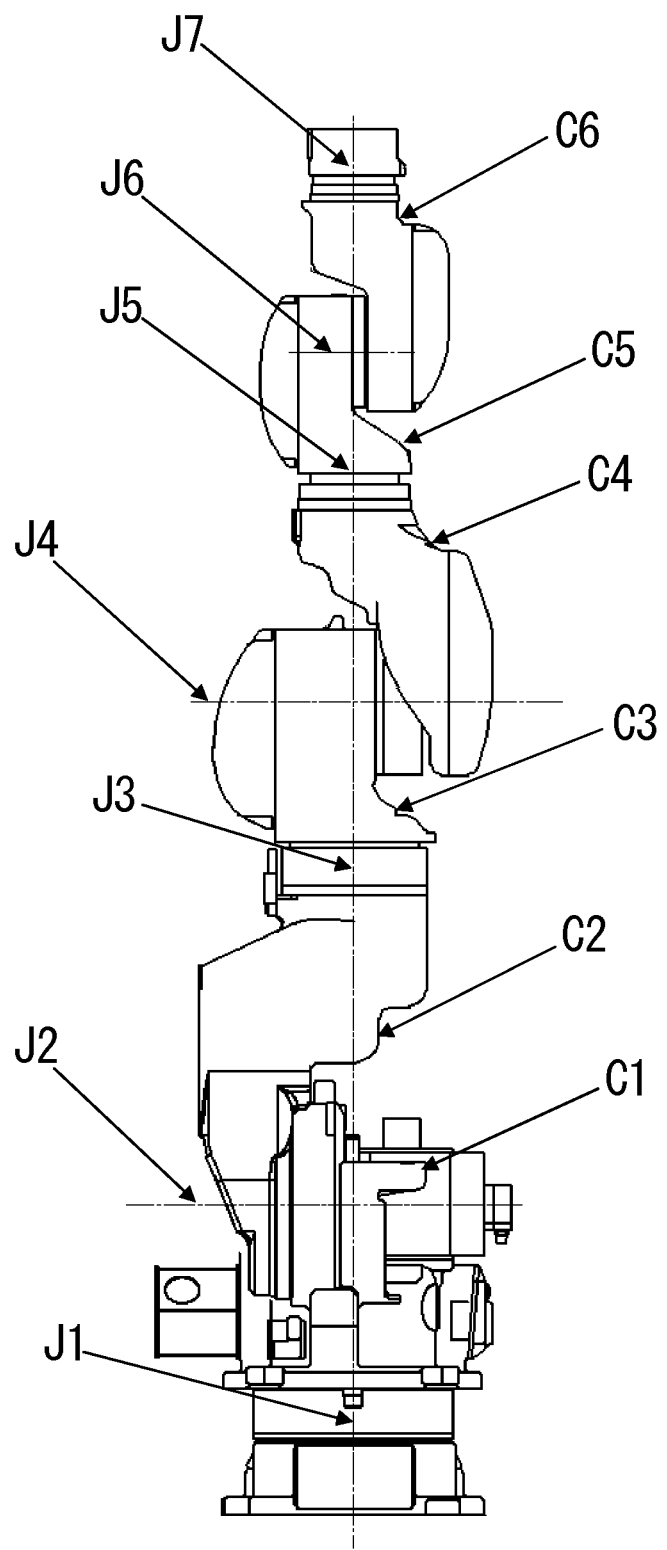
FIG. 2 is a front view of the robot manipulator.

FIG. 1 is a side view of a robot manipulator according to a first embodiment of the present invention, and FIG. 2 is a front view of the robot manipulator. A free-end arm body C6 includes a joint shaft J7. For example, a handling device provided with a force sensor, or a spot-welding gun device is attached to the joint shaft J7.

A first arm body C1 rotates around a first joint shaft J1 that is vertically arranged within a horizontal plane. A second arm body C2 rotates around a second joint shaft J2 that is arranged orthogonally to the first joint shaft J1. A third arm body C3 rotates around a third joint shaft J3 that is arranged orthogonally to the second joint shaft J2. A fourth arm body C4 rotates around a fourth joint shaft J4 that is arranged orthogonally to the third joint shaft J3. A fifth arm body C5 rotates around a fifth joint shaft J5 that is arranged orthogonally to the fourth joint shaft J4. A sixth arm body C6 rotates around a sixth joint shaft J6 that is arranged orthogonally to the fifth joint shaft J5. If the arm bodies extend vertically as shown in FIG. 1, the rotation centers of the third joint shaft J3, fifth joint shaft J5, and seventh joint shaft J7 are offset from the first joint shaft J1 toward the right side in the drawing. That is, the rotation centers of the third joint shaft J3, fifth joint shaft J5, and seventh joint shaft J7 are arranged at a distance from the rotation center of the first joint shaft J1.

Figure 3:
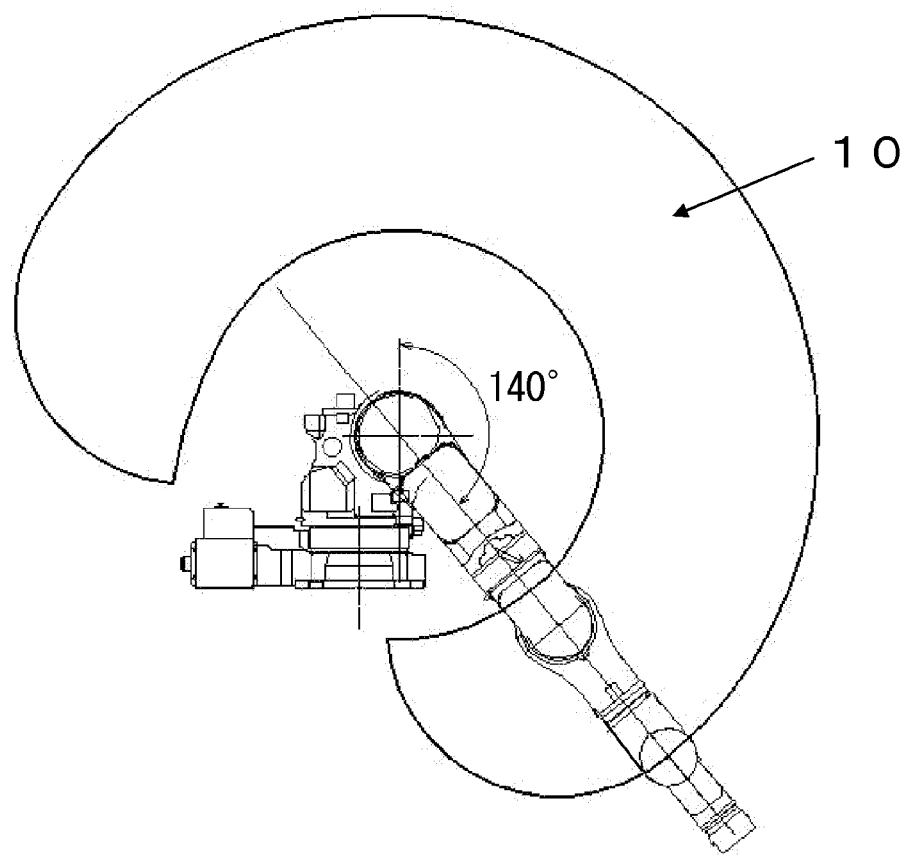
FIG. 3 is a side view showing a motion range of the robot manipulator.

With this arrangement, the motion range of the robot manipulator extends toward the lower right side in the drawing, like a motion range 10 of the robot manipulator shown in FIG. 3. Thus, an arm distal end of a robot can reach the inside of the robot, i.e., to a position below a lower surface of the robot.

In addition, since the rotation centers of the third, fifth, and seventh joint shafts are arranged at a certain distance from the first joint shaft, an interference region of arms is reduced in size, resulting in a frequently used motion range located in front of a robot expands.

Figure 4:
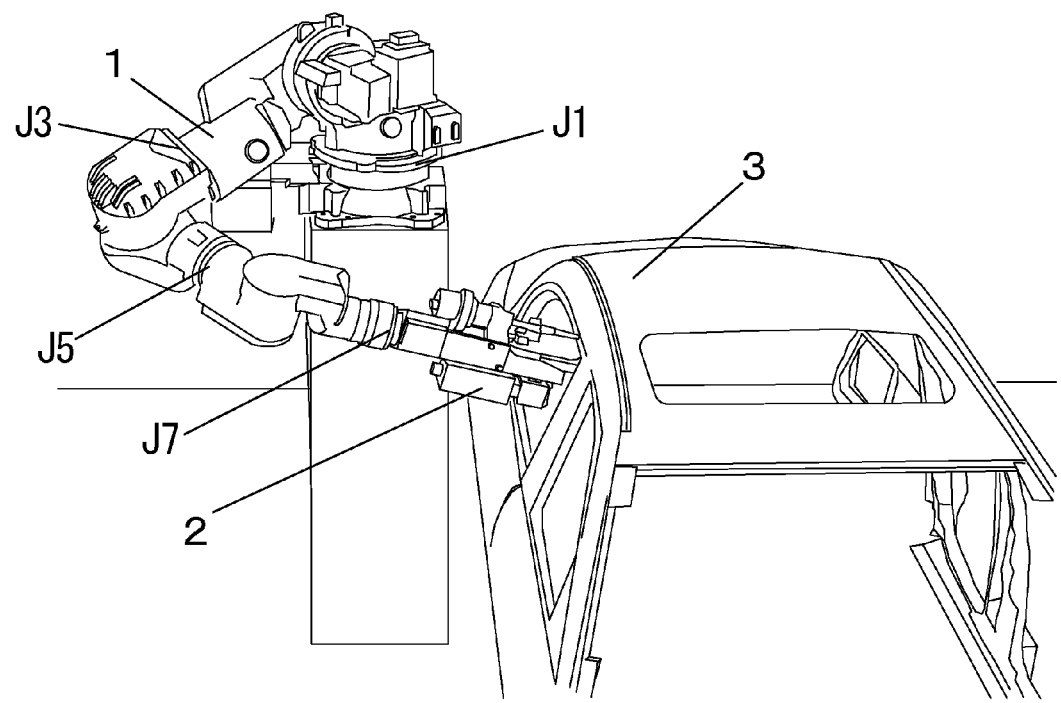
FIG. 4 is a rack-mounted robot manipulator.

Next, a case where a spot-welding gun is attached to an arm distal end will be described with reference to FIG. 4. A spot-welding gun 2 is attached to a distal end of a rack-mounted robot manipulator 1. The spot-welding gun 2 performs welding at a certain position of a workpiece 3. The robot manipulator 1 and the workpiece 3 are arranged such that the robot manipulator 1 is arranged in an upper area on a side near the workpiece 3 without interference. That is, the robot manipulator 1 is mounted on a rack. The workpiece 3 is moved by transporting means (not shown). The robot manipulator 1 approaches to the workpiece 3 from the upper side so that the spot-welding gun 2, which is attached to the distal end of the robot manipulator 1, performs welding at a certain position of the workpiece 3. The spot-welding gun 2 performs welding at a position near a base of the robot manipulator 1. For the welding, the rotation centers of the joint shafts J3, J5, and J7 are offset from the joint shaft J1. The spot-welding gun 2 is guided to the workpiece 3 that is arranged below the robot manipulator 1. The welding is performed within the movable range of the robot manipulator 1 that extends toward the lower side. Also, if the joint shaft J3 is rotated by a certain angle, the robot manipulator 1 can perform welding for the workpiece 3 that is arranged near the robot manipulator 1, while interference of the robot manipulator 1 is prevented from occurring.

In this embodiment, the example, in which the robot manipulator 1 on the base is mounted on the rack, has been described. However, the robot manipulator 1 may be mounted on a traveling truck that moves along a workpiece.

Figure 5:
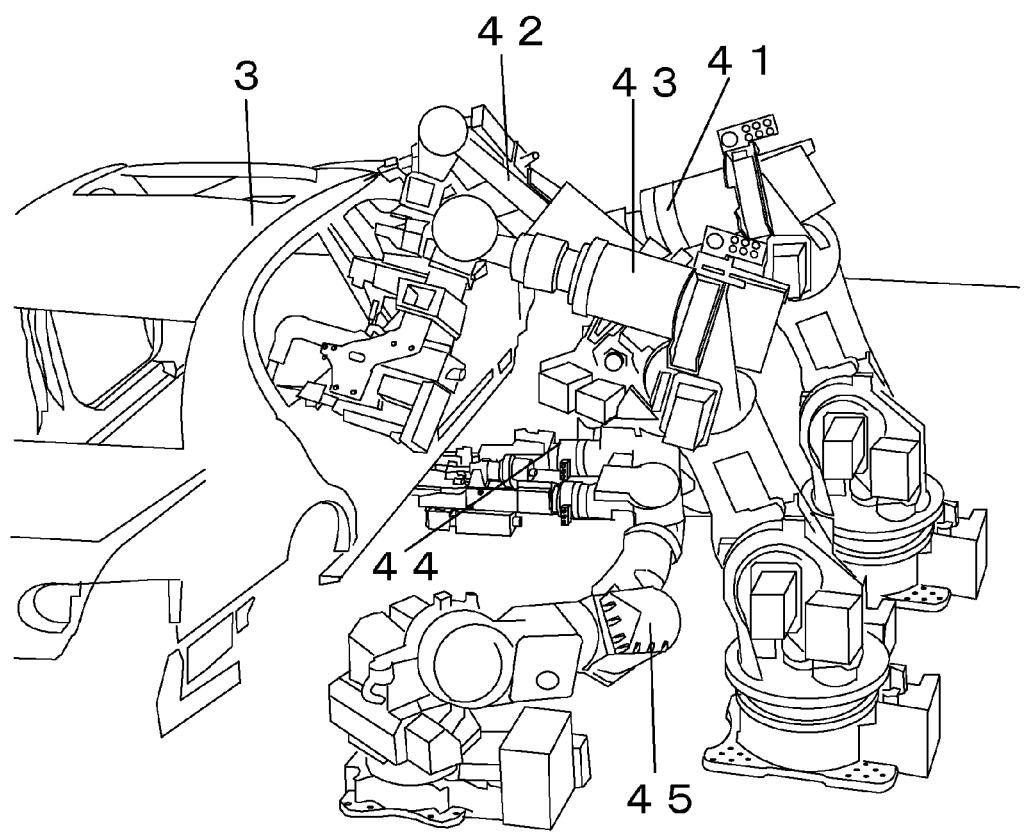
FIG. 5 is a working diagram of a plurality of robot manipulators.

Next, an example, in which a plurality of robot manipulators perform welding for a workpiece, will be described. In particular, an example, in which five robots are used to perform spot welding for a workpiece, will be described with reference to FIG. 5. Three six-axis robots 41, 42, and 43 perform welding for an upper section of a workpiece 3. Two robot manipulators 44 and 45 perform welding for a lower section of the workpiece 3. The arrangement of the robots is as follows. The first to third six-axis robots 41, 42, and 43 are arranged substantially in parallel to a transportation direction (toward the deep side in the drawing) of transporting means (not shown) for the workpiece 3. The first and second robot manipulators 44 and 45 are arranged between the workpiece 3 and the first to third six-axis robots 41, 42, and 43. Since the first to third six-axis robots 41, 42, and 43 performs welding for the upper section of the workpiece 3, a space below the first to third six-axis robots 41, 42, and 43 is an unused space. The first and second robot manipulators 44 and 45 are arranged in this space, so as to provide high-density arrangement of the robots.

Further, by rotating the joint shaft J3 by a certain angle, the first and second robot manipulators 44 and 45 can perform welding for the workpiece 3 arranged near the first and second robot manipulators 44 and 45 while interference of the first and second robot manipulators 44 and 45 is prevented from occurring.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A robot system comprising:
a first robot manipulator configured to work on a workpiece at a work area, the first robot manipulator having a plurality of arm bodies rotatably connected to each other; and
a second robot manipulator configured to work on the workpiece at the work area, the second robot manipulator having a plurality of arm bodies rotatably connected to each other,
wherein the first robot manipulator is arranged at a location between the work area and the second robot manipulator,
wherein the first robot manipulator and the second robot manipulator each comprises:
a base;
a first arm body rotatably and directly connected to the base, the first arm body being configured to rotate around a first rotational axis that extends in a vertical direction from the base;
a second arm body that is directly connected to the first arm body and configured to rotate around a second rotational axis that extends in a direction orthogonal to the first rotational axis; and
a third arm body that is directly connected to the second arm body and configured to rotate around a third rotational axis that extends in a direction orthogonal to the second rotational axis;
wherein the second robot manipulator is configured such that, when the second robot manipulator is extended in a vertical orientation such that the third rotational axis extends in the vertical direction and is parallel the first rotational axis, the first rotational axis offset from the third rotational axis by a predetermined distance, and
wherein the second robot manipulator further comprises:
a joint shaft at a distal end of the second robot manipulator having a motion range extending to a position below the base of the second robot manipulator.

2. The robot system according to claim 1, wherein the second robot manipulator has arm bodies having at least seven rotational axes.

3. The robot system according to claim 2, wherein the first robot manipulator has arm bodies having six rotational axes.

4. The robot system according to claim 1, wherein the first robot manipulator is arranged to work on a lower section of the workpiece, and the second robot manipulator is arranged to work on an upper section of the workpiece.

5. The robot system according to claim 1, wherein the first robot manipulator has arm bodies having six rotational axes.

6. The robot system according to claim 1, wherein the first robot manipulator and the second robot manipulator each further comprises:
a fourth arm body that is directly connected to the third arm body and configured to rotate around a fourth rotational axis that extends in a direction orthogonal to the third rotational axis;
a fifth arm body that is directly connected to the fourth arm body and configured to rotate around a fifth rotational axis that extends in a direction orthogonal to the fourth rotational axis; and
a sixth arm body that is directly connected to the fifth arm body and configured to rotate around a sixth rotational axis that extends in a direction orthogonal to the fifth rotational axis.

7. The robot system according to claim 6, wherein the second robot manipulator is configured such that, when the second robot manipulator is extended such that the third rotational axis and the fifth rotational axis both extend in the vertical direction and are parallel the first rotational axis, the first rotational axis is offset from the third rotational axis and the fifth rotational axis by the predetermined distance.

8. The robot system according to claim 6, wherein the first robot manipulator and the second robot manipulator each further comprises:
a seventh arm body that is directly connected to the sixth arm body and configured to rotate around a seventh rotational axis that extends in a direction orthogonal to the sixth rotational axis.

9. The robot system according to claim 8, wherein the second robot manipulator is configured such that, when the second robot manipulator is extended such that the third rotational axis, the fifth rotational axis, and the seventh rotational axis all extend in the vertical direction and are parallel the first rotational axis, the first rotational axis is offset from the third rotational axis, the fifth rotational axis, and the seventh rotational axis by the predetermined distance.

10. The robot system according to claim 9, wherein the seventh arm body is a handling device.

11. The robot system according to claim 9, wherein the seventh arm body is a welding device.

12. The robot system according to claim 1,
wherein the first robot manipulator is configured such that, when the first robot manipulator is extended in a vertical orientation such that the third rotational axis extends in the vertical direction and is parallel the first rotational axis, the first rotational axis offset from the third rotational axis by a predetermined distance, and
wherein the first robot manipulator further comprises:
a joint shaft at a distal end of the first robot manipulator having a motion range extending to a position below the base of the first robot manipulator.

13. The robot system according to claim 12,
wherein a plurality of the first robot manipulators is mounted in a first area,
wherein a plurality of the second robot manipulators is mounted in a second area, and
wherein the first area is arranged at a location between the work area and the second area.

14. The robot system according to claim 13,
wherein the plurality of first robot manipulators are configured to perform work on a lower section of the workpiece, and
wherein the plurality of second robot manipulators are configured to perform work on an upper section of the workpiece.

15. The robot system according to claim 1, wherein, when the second robot manipulator is extended to a maximum vertical reach, the first rotational axis is parallel to and offset from the third rotational axis by the predetermined distance.

16. The robot system according to claim 1,
wherein the second arm body has an elongated shape extending in a longitudinal direction thereof, and
wherein, when the second arm body is oriented with the longitudinal direction extending in an upward and vertical direction such that the third rotational axis extends in the vertical direction, the first rotational axis is parallel to and offset from the third rotational axis by the predetermined distance.

* * * * *